(12) United States Patent
Li et al.

(10) Patent No.: US 10,999,770 B2
(45) Date of Patent: May 4, 2021

(54) METHOD AND NETWORK ELEMENT FOR BEAM-BASED MOBILITY MANAGEMENT

(71) Applicant: Yulong Computer Telecommunication Scientific (Shenzhen) Co., Ltd., Guangdong (CN)

(72) Inventors: Mingju Li, Guangdong (CN); Yajun Zhu, Guangdong (CN); Yunfei Zhang, Guangdong (CN)

(73) Assignee: Yulong Computer Telecommunication Scientific (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 16/450,781

(22) Filed: Jun. 24, 2019

(65) Prior Publication Data

US 2019/0313308 A1     Oct. 10, 2019

Related U.S. Application Data

(63) Continuation of application No. PCT/CN2017/112855, filed on Nov. 24, 2017.

(30) Foreign Application Priority Data

Dec. 30, 2016   (CN) .......................... 201611265210.9

(51) Int. Cl.
*H04W 36/08*    (2009.01)
*H04B 17/318*   (2015.01)
(Continued)

(52) U.S. Cl.
CPC .......... *H04W 36/08* (2013.01); *H04B 17/318* (2015.01); *H04W 8/08* (2013.01);
(Continued)

(58) Field of Classification Search
CPC ..... H04W 36/08; H04W 36/30; H04W 24/08; H04W 24/02; H04W 36/0083;
(Continued)

(56) References Cited

U.S. PATENT DOCUMENTS 10,615,862 B2 *   4/2020   Islam ................... H04B 7/0421
2014/0073329 A1 * 3/2014   Kang .................... H04W 36/12
                                                           455/439
(Continued)

FOREIGN PATENT DOCUMENTS

CN       104115419 A      10/2014
CN       106134250 A      11/2016
(Continued)

OTHER PUBLICATIONS

Continuation-in-part (CIP) U.S. Appl. No. 15/335,353, filed Oct. 26, 2016.*

(Continued)

*Primary Examiner* — Ian N Moore
*Assistant Examiner* — Rushil Parimal Sampat

(57) ABSTRACT

A method and a network for beam-based mobility management are provided. The method includes the following. At least one beam signal and a signal strength of the at least one beam signal are acquired. A candidate transmission object is determined according to the signal strength of the at least one beam signal. Parameter information of the candidate transmission object is transmitted to a serving base station. Parameter information of a target handover object determined by the serving base station according to the parameter information of the candidate transmission object is received.

13 Claims, 7 Drawing Sheets

(51) Int. Cl.
    *H04W 36/00*     (2009.01)
    *H04W 8/08*     (2009.01)
    *H04W 72/04*     (2009.01)
    *H04W 88/02*     (2009.01)
    *H04W 36/30*     (2009.01)
    *H04W 24/08*     (2009.01)
    *H04W 24/02*     (2009.01)

(52) U.S. Cl.
    CPC ........... *H04W 24/02* (2013.01); *H04W 24/08* (2013.01); *H04W 36/0058* (2018.08); *H04W 36/0083* (2013.01); *H04W 36/30* (2013.01); *H04W 72/046* (2013.01); *H04W 88/02* (2013.01)

(58) Field of Classification Search
    CPC . H04W 36/0058; H04W 8/08; H04W 72/046; H04W 88/02; H04W 36/00835; H04W 36/0085; H04W 16/28; H04B 17/318; H04B 7/0617
    See application file for complete search history.

(56) References Cited

U.S. PATENT DOCUMENTS

2017/0374587 A1* 12/2017 Liu ................... H04L 5/0048
2018/0139673 A1* 5/2018 Peisa ................ H04W 36/0027

FOREIGN PATENT DOCUMENTS

| CN | 106165486 A | 11/2016 |
| CN | 106686631 A | 5/2017 |
| WO | 2016179804 A1 | 11/2016 |

OTHER PUBLICATIONS

International search report issued in corresponding international application No. PCT/CN2017/112855 dated Feb. 26, 2018.
First office action issued in corresponding China application No. 201611265210.9 dated Apr. 11, 2019.

* cited by examiner

METHOD AND NETWORK ELEMENT FOR BEAM-BASED MOBILITY MANAGEMENT

CROSS-REFERENCE TO RELATED APPLICATION(S)

This application is a continuation of PCT application No. PCT/CN2017/112855, filed on Nov. 24, 2017, which claims priority to Chinese Patent Application No. 201611265210.9, filed on Dec. 30, 2016, the disclosures of both of which are hereby incorporated by reference in their entireties.

TECHNICAL FIELD

The present disclosure relates to the field of communication technology, and particularly to a method and a network for beam-based mobility management.

BACKGROUND

For new radio (NR) technology of the fifth-generation (5G) mobile communication, in high-frequency signal transmission, the path loss such as the penetration loss is relatively large and the coverage is relatively small. In order to expand the coverage, 5G communication generally adopts a multi-beam transmission to increase the signal strength, that is, all transmission power is concentrated on one beam at the same time and one beam covers only a part of a 360-degree range. For example, if four beams are utilized to cover the 360-degree range, each beam only needs to cover 90 degrees of the 360-degree range, thereby increasing the coverage radius.

Currently, when using omnidirectional transmission for signal transmission, a user terminal will compare a signal strength of a serving cell with that of a neighboring cell. If the signal strength of the serving cell is much less than the signal strength of the neighboring cell, that is, the handover condition is reached, then the user terminal handovers a communication link from the current serving cell to a candidate neighboring cell selected as a target handover cell. However, for a multi-beam transmission, a cell may involve multiple beams. Therefore, how to select a suitable communication link handover object in the multi-beam transmission becomes a problem that needs to be solved currently.

SUMMARY

A method and a network element for beam-based mobility management are provided, to select a suitable communication link handover object to implement fast and accurate handover of a multi-beam based communication link.

In a first aspect, a method for beam-based mobility management is provided, and the method includes the following.

At least one beam signal and a signal strength of the at least one beam signal are acquired. A candidate transmission object is determined according to the signal strength of the at least one beam signal. Parameter information of the candidate transmission object is transmitted to a serving base station. Parameter information of a target handover object determined by the serving base station according to the parameter information of the candidate transmission object is received.

In a second aspect, a user terminal is provided. The user terminal includes a signal acquiring unit, an object determining unit, a transmitting unit, and an object receiving unit. The signal acquiring unit is configured to acquire at least one beam signal and a signal strength of the at least one beam signal. The object determining unit is configured to determine a candidate transmission object according to the signal strength of the at least one beam signal. The transmitting unit is configured to transmit parameter information of the candidate transmission object to a serving base station. The object receiving unit is configured to receive parameter information of a target handover object determined by the serving base station according to the parameter information of the candidate transmission object.

In a third aspect, a serving base station is provided. The serving base station includes an object receiving unit, an object determining unit, and a transmitting unit. The object receiving unit is configured to receive a candidate transmission object, and the candidate transmission object is determined by a user terminal according to at least one beam signal. The object determining unit is configured to determine a target handover object according to parameter information of the candidate transmission object. The transmitting unit is configured to transmit parameter information of the target handover object to the user terminal.

In a fourth aspect, a user device is provided. The user device includes a processor and a memory. The memory stores a set of programs, and the processor is configured to call the set of programs stored in the memory to cause the user device performs all or part of the methods in the first aspect.

In a fifth aspect, a serving base station is provided. The serving base station includes a processor and a memory. The memory stores a set of programs, and the processor is configured to call the set of programs stored in the memory to cause the serving base station to perform all or part of the methods in the second aspect.

In embodiments of the present disclosure, the at least one beam signal and the signal strength of the at least one beam signal are acquired. Thereafter, the candidate transmission object is determined according to the signal strength of the at least one beam signal and the parameter information of the candidate transmission object is transmitted to the serving base station. Finally, the parameter information of the target handover object determined by the serving base station according to the parameter information of the candidate transmission object is received. The target handover object is selected as a handover object of the communication link according to the signal strength of the at least one beam signal, and a fast and accurate handover of a multi-beam based communication link is realized.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description illustrate some embodiments of the present disclosure. Those of ordinary skill in the art may also obtain other drawings based on these accompanying drawings without creative efforts.

DETAILED DESCRIPTION

Technical solutions in embodiments of the present disclosure will be described clearly and completely hereinafter with reference to the accompanying drawings in the embodiments of the present disclosure. Apparently, the described embodiments are merely some rather than all embodiments of the present disclosure. All other embodiments obtained by those of ordinary skill in the art based on the embodiments of the present disclosure without creative efforts shall fall within the protection scope of the present disclosure.

Figure 1:
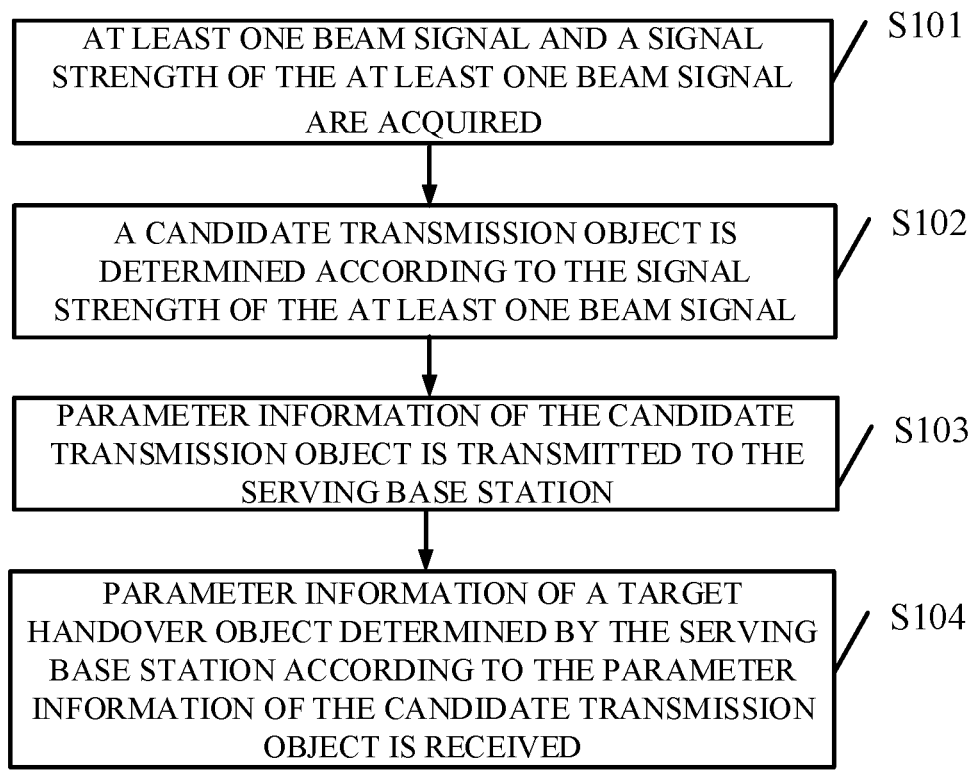
FIG. 1 is a schematic flow chart of a method for beam-based mobility management according to an embodiment of the present disclosure.

FIG. 1 is a schematic flow chart of a method for beam-based mobility management according to an embodiment of the present disclosure. Referring to FIG. 1, the method for beam-based mobility management begins at S101.

At S101, at least one beam signal and a signal strength of the at least one beam signal are acquired.

In one embodiment, a user terminal acquires the least one beam signal and the signal strength of the at least one beam signal. In the embodiments of the present disclosure, multiple neighboring base stations and a serving base station are capable of transmitting beam signals, and the user terminal is capable of receiving at least one beam signal of the beam signals transmitted and detecting a signal strength of the at least one beam signal. The at least one beam signal may include at least one neighboring beam signal and a current serving beam signal. In this case, the current serving beam signal refers to a beam signal currently providing communication service for the user terminal. The neighboring beam signal includes at least one of beam signals in at least one neighboring cell and beam signals other than the current serving beam signal in a serving cell. In the embodiments of the present disclosure, the serving cell is a cell to which the current serving beam signal belongs, and the at least one neighboring cell is a cell neighboring the serving cell. One serving base station may correspond to at least one serving cell, and one neighboring base station corresponds to at least one neighboring cell.

At S102, a candidate transmission object is determined according to the signal strength of the at least one beam signal.

In one embodiment, the user terminal determines the candidate transmission object according to the signal strength of the at least one beam signal. The candidate transmission object may include at least one of one or more first candidate transmission beams and one or more candidate transmission cells. In the embodiments of the present disclosure, the user terminal may select one or more beam signals from the at least one beam signal as the one or more first candidate transmission beams according to the signal strength of the at least one beam signal. Alternatively, the user terminal may select one or more beam signals from the at least one beam signal as one or more second candidate transmission beams according to the signal strength of the at least one beam signal, and further select at least one cell from the cell to which the one or more second candidate transmission beams belong as one or more candidate transmission cells.

At S103, parameter information of the candidate transmission object is transmitted to the serving base station.

In one embodiment, the user terminal transmits the parameter information of the candidate transmission object to the serving base station. Parameter information of each first candidate transmission beam includes cell identification information of a cell to which the respective first candidate transmission beam belongs, identification information of the respective first candidate transmission beam, and a signal strength of the respective first candidate transmission beam. Parameter information of each candidate transmission cell includes cell identification information and a signal strength of the respective candidate transmission cell.

As one embodiment, the parameter information of each first candidate transmission beam further includes beam configuration information of the cell to which the respective first candidate transmission beam belongs, and the beam configuration information includes the number of beams operating simultaneously and a beam width of the cell to which the respective first candidate transmission beam belongs. The parameter information of each candidate transmission cell further includes beam configuration information of the respective candidate transmission cell, and the beam configuration information includes the number of beams operating simultaneously and the beam width of the respective candidate transmission cell. It is noted that the user terminal can obtain the beam configuration information by receiving system information transmitted by each neighboring base station, and transmit the beam configuration information to the serving base station. Alternatively, each neighboring base station directly transmits beam configuration information of a cell to which the at least one beam belongs to the serving base station.

At S104, parameter information of a target handover object determined by the serving base station according to the parameter information of the candidate transmission object is received.

In one embodiment, the user terminal receives the parameter information of the target handover object determined by the serving base station according to the parameter information of the candidate transmission object. The candidate transmission object may include at least one of the one or more first candidate transmission beams and the one or more candidate transmission cells, and the target handover object may include at least one of a target handover cell and a target handover beam.

In the embodiments of the present disclosure, when the parameter information of the candidate transmission object is transmitted to the serving base station by the user terminal, the serving base station selects the target handover object from the candidate transmission object according to the parameter information of the candidate transmission object received and transmits the parameter information of the target handover object to the user terminal. For example, a beam signal whose signal strength is the maximum signal strength in candidate transmission beams is selected as the target handover beam, and a cell to which the target handover beam belongs is selected as the target handover cell. Alternatively, a cell whose signal strength is the maximum signal strength in the one or more candidate transmission cells is selected as the target handover cell. The parameter information of the target handover object may include parameter information of the target handover beam and/or parameter information of the target handover cell. The parameter information of the target handover beam includes cell identification information of the cell to which the target handover beam belongs and identification information of the target handover beam. The parameter information of the target handover cell includes cell identifier information of the target handover cell.

In the embodiments of the present disclosure, the at least one beam signal and the signal strength of the at least one beam signal are acquired. Thereafter, the candidate transmission object is determined according to the signal strength of the at least one beam signal and the parameter information of the candidate transmission object is transmitted to the serving base station. Finally, the parameter information of the target handover object determined by the serving base station according to the parameter information of the candidate transmission object is received. The target handover object is selected as a handover object of the communication link according to the signal strength of the at least one beam signal, and a fast and accurate handover of a multi-beam based communication link is realized.

Figure 2:
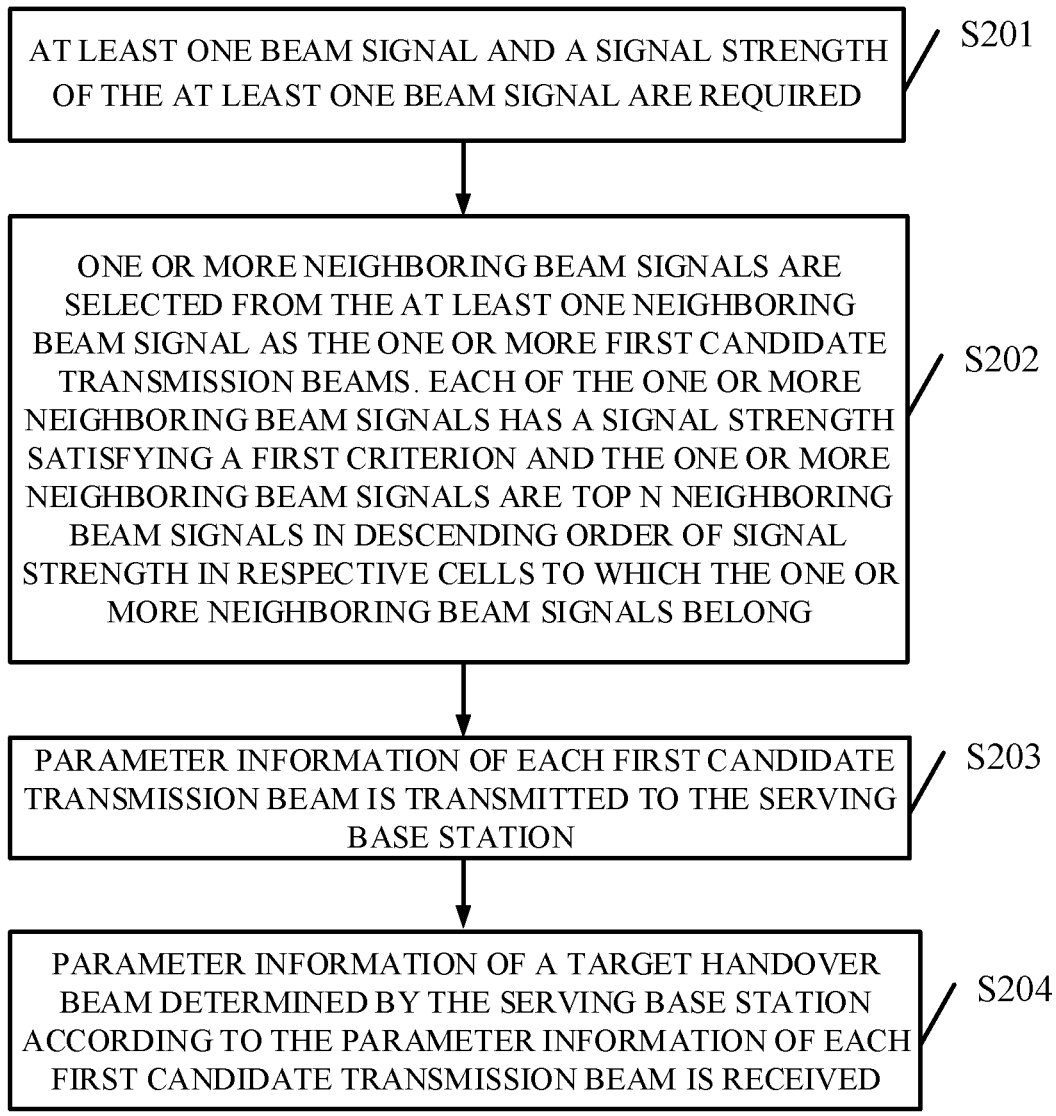
FIG. 2 is a schematic flow chart of another method for beam-based mobility management according to an embodiment of the present disclosure.

FIG. 2 is a schematic flow chart of another method for beam-based mobility management according to an embodiment of the present disclosure. Referring to FIG. 2, the method for beam-based mobility management begins at S201.

At S201, at least one beam signal and a signal strength of the at least one beam signal are required.

In one embodiment, a user terminal acquires the at least one beam signal and the signal strength of the at least one beam signal. For specific implementations of S201, reference may be made to detailed description of S101 corresponding to the embodiments of FIG. 1, and details are not described herein.

At S202, one or more neighboring beam signals are selected from the at least one neighboring beam signal as the one or more first candidate transmission beams. Each of the one or more neighboring beam signals has a signal strength satisfying a first criterion and the one or more neighboring beam signals are top N neighboring beam signals in descending order of signal strength in respective cells to which the one or more neighboring beam signals belong.

In one embodiment, the user terminal selects the one or more neighboring beam signals from the at least one neighboring beam signal as the one or more first candidate transmission beams. Each of the one or more neighboring beam signals has the signal strength satisfying the first criterion and the one or more neighboring beam signals are the top N neighboring beam signals in descending order of signal strength in respective cells to which the one or more neighboring beam signals belong. The first criterion includes one of: a difference between a signal strength of the current serving beam signal and a signal strength of the neighboring beam signal is greater than a first offset value, the signal strength of the neighboring beam signal is greater than a first threshold value, and the signal strength of the neighboring beam signal is greater than a second threshold value and the signal strength of the current serving beam signal is less than a third threshold value. As one embodiment, a value of N is determined according to one of: radio resource control (RRC) configuration information or system information of the serving base station, and beam configuration information of respective cells to which the one or more first candidate transmission beams belong.

For example, assume that the one or more neighboring beam signals include beam 1-beam 9, beam 1-beam 3 belong to cell 1 and whose signal strengths are 1 dBm, 2 dBm, and 3 dBm correspondingly, beam 4-beam 6 belong to cell 2 and whose signal strengths are 4 dBm, 5 dBm, and 6 dBm correspondingly, beam 7-beam 9 belong to cell 3 and whose signal strengths are 7 dBm, 8 dBm, and 9 dBm correspondingly, and the current serving beam signal is beam 10 whose signal strength is 4 dBm. The first criterion is set as that the difference between the signal strength of the neighboring beam signal and the signal strength of the current serving beam signal is greater than the first offset value, and the first offset value is set as 1 dBm. In this case, beam 6 in cell 2, and beam 7, beam 8, and beam 9 in cell 3 satisfy the first criterion. Assuming that the first offset value is 1 and the value of N is 2, the one or more neighboring beam signals whose signal strengths each satisfy the first criterion and being top N neighboring beam signals in descending order of signal strength in respective cells to which the one or more neighboring beam signals belong include beam 6 in cell 2, and beam 8 and beam 9 in cell 3. Thus, the one or more first candidate transmission beams include beam 6, beam 8, and beam 9.

At S203, parameter information of each first candidate transmission beam is transmitted to the serving base station.

In one embodiment, the user terminal transmits the parameter information of each first candidate transmission beam to the serving base station. The parameter information of each first candidate transmission beam includes cell identification information of a cell to which the respective first candidate transmission beam belongs, identification information of the respective first candidate transmission beam, and a signal strength of the first candidate transmission beam.

In one embodiment, the parameter information of each first candidate transmission beam further includes beam configuration information of the cell to which the respective first candidate transmission beam belongs, and the beam configuration information includes the number of beams operating simultaneously and a beam width of the cell to which the respective first candidate transmission beam belongs. The user terminal can acquire each beam configuration information by receiving information of the respective neighboring base station. As one embodiment, each beam configuration information can be acquired by any of the following. The user terminal receives one of a primary synchronization signal (PSS) and a secondary synchronization signal (SSS) carrying the beam configuration information of a cell to which each of the at least one beam signal belongs from each neighboring base station. The user terminal receives a physical broadcast channel (PBCH) carrying the beam configuration information of the cell to which each of the at least one beam signal belongs from each neighboring base station. The user terminal receives a system information block (SIB) message carrying the beam configuration information of the cell to which each of the at least one beam signal belongs from each neighboring base station. It is noted that the user terminal can acquire each beam configuration information by receiving the information transmitted by the respective neighboring base station, and transmit each beam configuration information acquired to the serving base station. Alternatively, the beam configuration information of the cell to which each of the at least one beam signal belongs is directly transmitted, by the respective neighboring base station, to the serving base station.

At S204, parameter information of a target handover beam determined by the serving base station according to the parameter information of each first candidate transmission beam is received.

In one embodiment, the user terminal receives the parameter information of the target handover beam, which is determined by the serving base station according to the parameter information of each first candidate transmission beam. When the parameter information of each first candidate transmission beam is transmitted to the serving base station by the user terminal, the serving base station selects the target handover beam from the one or more first candidate transmission beams according to the parameter information of each first candidate transmission beam received and selects a target handover cell corresponding to the target handover beam selected, and sends the parameter information of the target handover beam to the user terminal.

In one embodiment, the serving base station may select, from one or more first candidate transmission beams, a beam signal whose signal parameter value is the maximum signal parameter value as the target handover beam according to the parameter information of each of the one or more first candidate transmission beams, and further select a cell to which the target handover beam belongs as the target handover cell. The signal parameter value includes one of a signal strength of the beam signal and a signal feature value of the beam signal, and the signal feature value of the beam signal is proportional to the signal strength of the beam signal, and the beam width of the cell to which the beam signal belongs and the number of beams operating simultaneously in the cell.

For example, the one or more first candidate transmission beams include beam 6 in cell 2, and beam 8 and beam 9 in cell 3. The signal strengths of beam 6, beam 8, and beam 9 are 6 dBm, 8 dBm, and 9 dBm correspondingly. In this case, beam 9 whose signal strength is the maximum signal strength is selected as the target handover beam, and cell 3 to which beam 9 belongs may be further selected as the target handover cell corresponding to the target handover beam.

For another example, the one or more first candidate transmission beams include beam 6 in cell 2, and beam 8 and beam 9 in cell 3. Assuming that the signal strengths of beam 6, beam 8, and beam 9 are 6 dBm, 8 dBm, and 9 dBm correspondingly, the beam width of cell 2 is X2 and the number of beams operating simultaneously in cell 2 is three, and the beam width of cell 3 is X3 and the number of beams operating simultaneously in cell 3 is three, then signal feature value Y of the beam signal can be calculated according to the following formula (1).

$$Y = RSRP * (X/360) * N \quad (1)$$

In formula (1), Y is defined as the signal feature value and RSRP is defined as the signal strength of the beam signal. The signal strength of the beam signal may be one of a reference signal receiving power (RSRP), a reference signal receiving quality (RSRQ), and a received signal strength indication (RSSI). X is defined as the beam width of the cell.

For example, each beam has a coverage area of 30 degrees, and then X is equal to 30 degrees. N is defined as the number of beams operating simultaneously in the cell. For example, two beams each having the coverage area of 30 degrees are configured to scan simultaneously, and a difference between the directions of the two beams is 180 degrees, such that each beam is responsible for scanning a range of 180 degrees, while a transmission power of each beam is half of a transmission power of the base station.

It is calculated that the signal feature values of beam 6, beam 8, and beam 9 are Y1, Y2, and Y3 correspondingly. If Y2 is the maximum signal feature value, beam 8 corresponding to signal feature value Y2 is determined as the target handover beam, and cell 3 to which beam 8 belongs is further used as the target handover cell corresponding to the target handover beam.

In another embodiment, the serving base station can determine the target handover beam according to the parameter information of each first candidate transmission beam. The serving base station may acquire cell parameter values of respective cells to which the one or more first candidate transmission beams belong according to average values or weighted average values of signal parameter values of all beam signals in the respective cells to which the one or more first candidate transmission beams belong, and determine a cell whose cell parameter value is the maximum cell parameter value from the cells to which the one or more first candidate transmission beams belong as the target handover cell, and further determine a beam signal whose signal parameter value is the maximum signal parameter value in the target handover cell as the target handover beam. The signal parameter value includes one of the signal strength of the beam signal and the signal feature value of the beam signal, and the signal feature value of the beam signal is proportional to the signal strength of the beam signal, and the beam width of the cell to which the beam signal belongs and the number of beams operating simultaneously in the cell.

In this embodiment, when a signal strength of a cell is calculated according to signal strengths of multiple beam signals, different weights can be assigned to signal strengths of different beams in the cell. A greater signal strength results in a greater weight, and the sum of all weights is equal to one. How weights are assigned is related to a coverage angle of each beam. For example, the weight of the greatest signal strength is represented as x, the weights of one or two second greatest signal strengths are represented as x−delta 1 (that is, x minus delta 1), the weights of one or two third greatest signal strengths are represented as x−delta 1−delta 2 (that is, x minus delta 1 and delta 2), and so on, so that more possible delta_i can be determined according to the number n' of the beam signals, where i is less than n'. If the beam width of each cell is different, the value of delta_i may differ depending on the cells and be proportional to the coverage angle of the respective beam. In one embodiment, the value of delta_i of the serving cell or each of at least one neighboring cell of the serving base station is determined by the serving base station, and the value of delta_i of each of at least one neighboring cell of each neighboring base station is acquired in the following two modes. In the first mode, the serving base station acquires, from each neighboring base station, the value of delta_i of each of the at least one neighboring cell of the respective neighboring base station through an interface(s) between the serving base station and the respective neighboring base station. In the second mode, the user terminal acquires the value of delta_i of each of the at least one neighboring cell of the respective neighboring base station through receiving system information of the respective neighboring base station and transmits the value of delta_i together with the parameter information of each first candidate transmission beam to the serving base station.

For example, the one or more first candidate transmission beams include beam 6 in cell 2, beam 8 and beam 9 in cell 3, and the signal strengths of beam 6, beam 8, and beam 9 are 6 dBm, 8 dBm, and 9 dBm correspondingly. It is calculated that the average value of the signal strengths of the beams in cell 2 is 6 dBm, and the average value of the signal strengths of the beams in cell 3 is 8.5 dBm. By comparison, cell 3 is determined as the target handover cell, and beam 9 whose signal strength is the maximum signal strength in the target handover cell is further determined as the target handover beam. In this embodiment, the signal strength can also be replaced by other signal parameters such as the signal feature value.

For example, the one or more first candidate transmission beams include beam 6 in cell 2, beam 8 and beam 9 in cell 3, the signal strengths of beam 6, beam 8, and beam 9 are 6 dBm, 8 dBm, and 9 dBm correspondingly, and both cell 2 and cell 3 have three beam signals. Assuming that the weight of the beam signal whose signal strength is the maximum signal strength in each cell is represented as x and the sum of the weights of all beam signals in each cell is one, then the weight of beam 6 is one, the weight of beam 8 is represented as [(1−delta 1)/2], and the weight of beam 9 is represented as (1+delta 1)/2. It is calculated that the weighted average value of the signal strengths of the beam signals in cell 2 is 6 dBm, and the weighted average value of the signal strengths of the beam signals in cell 3 is [(17+delta 1)/2] dBm. Comparing the two weighted average values, the cell whose weighted average value is the maximum weighted average value is determined as the target handover cell, and the beam signal whose signal strength is the maximum signal strength in the target handover cell is determined as the target handover beam.

In the embodiments of the present disclosure, the at least one beam signal and the signal strength of the at least one beam signal are acquired. The one or more neighboring beam signals are selected from the at least one neighboring beam signal as the one or more first candidate transmission beams, where each of the one or more neighboring beam signals has the signal strength satisfying the first criterion and the one or more neighboring beam signals are top N neighboring beam signals in descending order of signal strength in respective cells to which the one or more neighboring beam signals belong. Thereafter, the parameter information of each first candidate transmission beam is transmitted to the serving base station. Finally, the parameter information of the target handover beam determined by the serving base station according to the parameter information of each first candidate transmission beam is received. The target handover object is selected as a handover object of the communication link according to the signal strength of the at least one beam signal, and a fast and accurate handover of a multi-beam based communication link is realized.

Figure 3:
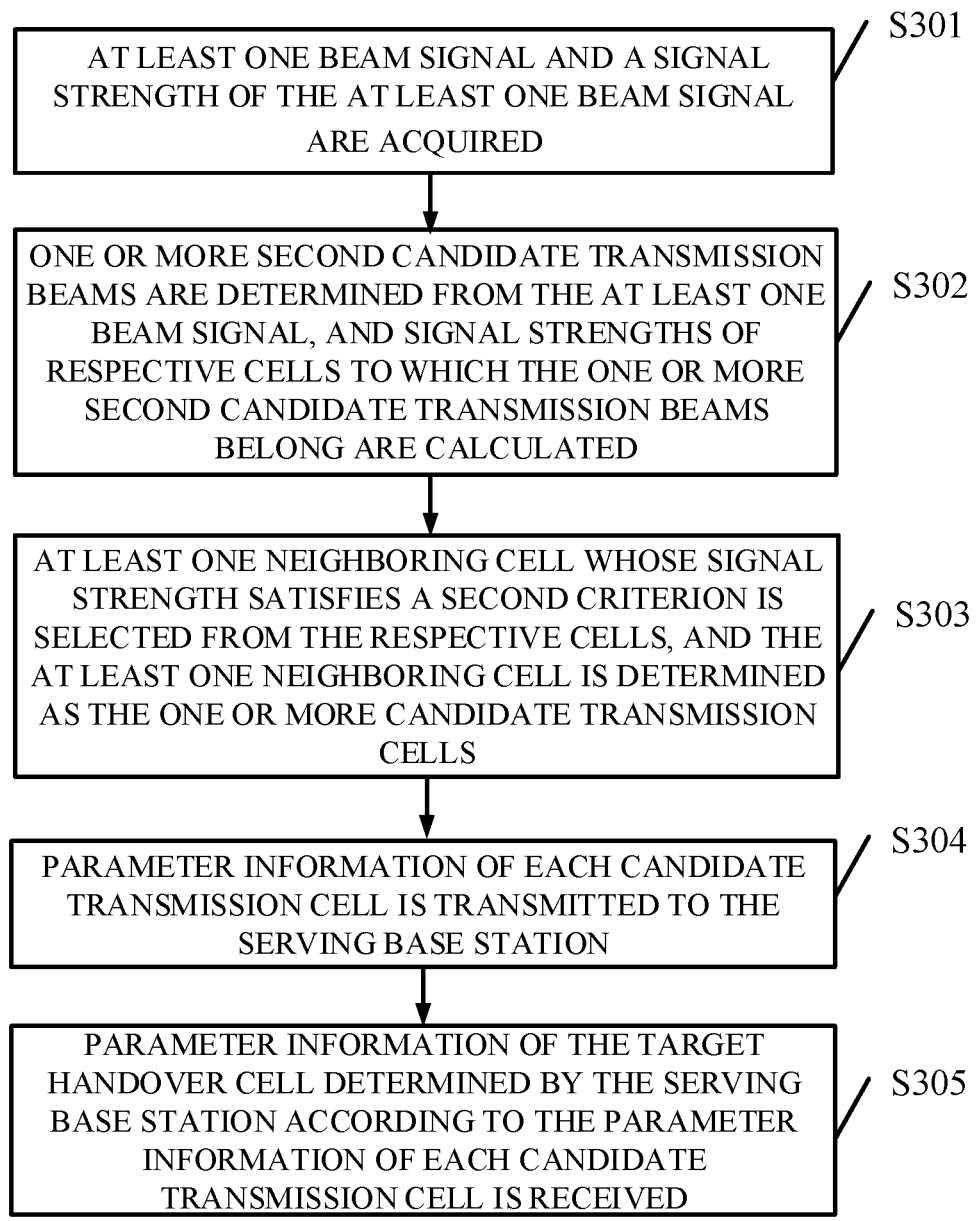
FIG. 3 is a schematic flow chart of yet another method for beam-based mobility management according to an embodiment of the present disclosure.

FIG. 3 is a schematic flow chart of yet another method for beam-based mobility management according to an embodiment of the present disclosure. Referring to FIG. 3, the method for beam-based mobility management starts at S301.

At S301, at least one beam signal and a signal strength of the at least one beam signal are acquired.

In one embodiment, a user terminal acquires the least one beam signal and the signal strength of the at least one beam signal. For specific implementations of S301, reference may be made to detailed description of S101 corresponding to the embodiments of FIG. 1, and details are not described herein.

At S302, one or more second candidate transmission beam are determined from the at least one beam signal, and signal strengths of respective cells to which the one or more second candidate transmission beams belong are calculated.

In one embodiment, the user terminal determines a signal strength of a cell to which each of the at least one beam signal belongs. The user terminal may first determine the one or more second candidate transmission beams, and then calculate the signal strengths of respective cells to which the one or more second candidate transmission beams belong.

The one or more second candidate transmission beams are determined by the user terminal as follows. One or more neighboring beam signals whose signal strengths satisfy a third criterion are selected from the at least one neighboring beam signal, and the one or more neighboring beam signals selected are determined as the one or more second candidate transmission beams. The third criterion includes one of: a difference between the signal strength of the current serving beam signal and the signal strength of the neighboring beam signal is greater than a third offset value; the signal strength of the neighboring beam signal is greater than a seventh threshold value; and the signal strength of the neighboring beam signal is greater than an eighth threshold and the signal strength of the current serving beam signal is less than a ninth threshold value.

For example, assume that the one or more neighboring beam signals include beam 1-beam 9, beam 1-beam 3 belong to cell 1 and whose signal strengths are 1 dBm, 2 dBm, and 3 dBm correspondingly, beam 4-beam 6 belong to cell 2 and whose signal strengths are 4 dBm, 5 dBm, and 6 dBm correspondingly, beam 7-beam 9 belong to cell 3 and whose signal strengths are 7 dBm, 8 dBm, and 9 dBm correspondingly, and the current serving beam signal is beam 11 whose signal strength is 1 dBm. The third criterion is set as that the difference between the signal strength of the current serving beam signal and the signal strength of the neighboring beam signal is greater than the third offset value, and the third offset value is set as 3 dBm. In this case, beam 5 and beam 6 in cell 2, beam 7, beam 8, and beam 9 in cell 3 satisfy the third criterion, and thus the one or more second candidate transmission beams include beam 5-beam 9.

In one embodiment, the user terminal may acquire at least one target cell to which the one or more second candidate transmission beams belong, and determine whether the number of the one or more second candidate transmission beams in each of the at least one target cell is greater than M.

If the number of the one or more second candidate transmission beams in a target cell is less than or equal to M, the target cell is determined as a first target cell, where a signal strength of the first target cell is an average value or weighted average value of signal strengths of the one or more second candidate transmission beams in the first target cell.

If the number of the one or more second candidate transmission beams in a target cell is greater than M, the target cell is determined as a second target cell, where a signal strength of the second target cell is an average value or weighted average value of signal strengths of top M second candidate transmission beams in descending order of signal strength in the target cell.

A value of M is determined according to radio resource control (RRC) configuration information or system information of the serving base station. Alternatively, the value of M is determined according to beam configuration information of the respective cells to which the one or more second candidate transmission beams belong.

In this embodiment, when a signal strength of a cell is calculated, different weights can be assigned to signal strengths of different beams in the cell. A greater signal strength results in a greater weight, and the sum of all weights is equal to one. How weights are assigned is related to a coverage angle of each beam. For example, the weight of the greatest signal strength is represented as x, the weights of one or two second greatest signal strengths are represented as x−delta 1 (that is, x minus delta 1), the weights of one or two third greatest signal strengths are represented as x−delta 1−delta 2 (that is, x minus delta 1 and delta 2), and so on, so that more possible delta_i can be determined according to the number n' of the beam signals, where i is less than n'. If a beam width of each cell is different, the value of delta_i may differ depending on the cells and be proportional to the coverage angle of the respective beam. In one embodiment, the value of delta_i of the serving cell or each of the at least one neighboring cell is determined by the user terminal. The user terminal can acquire information of the value of delta_i of the serving cell through receiving RRC dedicated information or system information of the serving cell, and the RRC dedicated information may be information related to measuring configuration or measuring report configuration. The value of delta_i of each of the at least one neighboring cell is acquired in the following two modes. In the first mode, the user terminal acquires the value of delta_i of each of the at least one neighboring cell through receiving system information of the respective neighboring cell. In the second mode, the serving base station acquires, from each neighboring base station, the value of delta_i of each of the at least one neighboring cell through an interface(s) between the serving base station and the respective neighboring base station, and transmits the value of delta_i acquired to the user terminal through the RRC dedicated information, where the RRC dedicated information may be information related to measuring configuration or measuring report configuration.

For example, assume that the one or more second candidate transmission beams include beam 5-beam 9 whose signal strengths are 5 dBm, 6 dBm, 7 dBm, 8 dBm, and 9 dBm correspondingly, beam 5 and beam 6 belong to cell 2, beam 7-beam 9 belong to cell 3, and the value of M is two. In this case, the number of the second candidate transmission beams in cell 2 is two, that is, cell 2 is determined as the first target cell, and an average value or weighted average value of signal strengths of the two second candidate transmission beams in cell 2 (that is, beam 5 and beam 6) can be determined as a signal strength of cell 2. Since the number of the second candidate transmission beams in cell 3 is three, which is larger than the value of M (i.e., two), a signal strength of cell 3 is an average value or weighted average value of signal strengths of top two second candidate transmission beams in descending order of signal strength in cell 3 (that is, beam 8 and beam 9).

For another example, assume that the one or more second candidate transmission beams include beam 5-beam 9 whose signal strengths are 5 dBm, 6 dBm, 7 dBm, 8 dBm, and 9 dBm correspondingly, beam 5 and beam 6 belong to cell 2, beam 7-beam 9 belong to cell 3, the weight of the beam signal whose signal strength is the maximum signal strength in each cell is represented as x and the sum of the weights of all beam signals in each cell is one. The weight of beam 5 is represented as (1−delta 1)/2, the weight of beam 6 is represented as (1+delta 1)/2, the weights of beam 7 and beam 8 are represented as (1−delta 1)/3, and the weight of beam 9 is represented as (1+2*delta 1)/3. It is calculated that the weighted average value of signal strengths of cell 2 is [(11+delta 1)/2] dBm, and the weighted average value of signal strengths of cell 3 is (8+delta 1) dBm. Comparing the above-mentioned weighted average values, the cell whose weighted average value is the maximum weighted average value is determined as the target handover cell, and the beam signal whose signal strength is the maximum signal strength in the target handover cell is determined as the target handover beam.

In one embodiment, a signal strength of the serving cell may also be calculated, with reference to the implementations in S302, by selecting beam signals from top M beam signals in the serving cell in descending order of signal strength. It is noted that the signal strength of the current serving beam participates in the calculation of signal strength of the serving cell. The signal strength of the serving cell is calculated by selecting beam signals from M beam signals whose signal strengths satisfy a criterion, and parameters involved in the criterion may be different from parameters involved in the third criterion, for example, the third offset value involved in the criterion is different from that involved in the third criterion.

At S303, at least one neighboring cell whose signal strength satisfies a second criterion is selected from the respective cells, and the at least one neighboring cell is determined as the one or more candidate transmission cells.

In one embodiment, the user terminal selects the at least one neighboring cell whose signal strength satisfies the second criterion from the respective cells, and determines the at least one neighboring cell as the one or more candidate transmission cells. The second criterion includes one of the following. A difference between the signal strength of the serving cell and the signal strength of the neighboring cell is greater than a second offset value. The signal strength of the neighboring cell is greater than a fourth threshold value. The signal strength of the neighboring cell is greater than a fifth threshold and the signal strength of the serving cell is less than a sixth threshold value.

For example, assume that the respective cells to which the one or more second candidate transmission beams belong include cell 2 and cell 3, the signal strengths of cell 2 and cell 3 are 5.5 dBm and 8.5 dBm correspondingly, the signal strength of the serving cell is 5 dBm, and the second offset value is set as 1 dBm. In this case, cell 3 satisfies the second criterion, and thus cell 3 is determined as the candidate transmission cell.

At S304, parameter information of each candidate transmission cell is transmitted to the serving base station.

In one embodiment, the user terminal transmits the parameter information of each candidate transmission cell to the serving base station. The parameter information of each candidate transmission cell includes cell identification information and a signal strength of the respective candidate transmission cell. The parameter information of each candidate transmission cell further includes beam configuration information of the respective candidate transmission cell, and the beam configuration information of the respective candidate transmission cell includes the number of beams operating simultaneously and the beam width of the respective candidate transmission cell. The user terminal can acquire the beam configuration information of each cell through the respective neighboring base station, and the beam configuration information of each cell is acquired as any of the following. A primary synchronization signal (PSS) or a secondary synchronization signal (SSS) carrying the beam configuration information of each cell is received from the respective neighboring base station. A physical broadcast channel (PBCH) carrying the beam configuration information of each cell is received from the respective neighboring base station. A system information block (SIB) message carrying the beam configuration information of each cell is received from the respective neighboring base station.

At S305, parameter information of the target handover cell determined by the serving base station according to the parameter information of each candidate transmission cell is received.

In one embodiment, the user terminal receives the parameter information of the target handover cell determined by the serving base station according to the parameter information of each candidate transmission cell. When the parameter information of each candidate transmission cell is transmitted to the serving base station by the user terminal, the serving base station selects the target handover cell from the one or more candidate transmission cells according to the parameter information of each candidate transmission cell received and sends the parameter information of the target handover cell to the user terminal.

In one embodiment, the serving base station may select, from the one or more candidate transmission cells, a cell whose cell parameter value is the maximum cell parameter value as the target handover cell according to the parameter information of each candidate transmission cell. The cell parameter value of a cell includes one of a signal strength of the cell and a signal feature value of the cell, and the signal feature value of the cell is proportional to the signal strength of the cell, the beam width of the cell, and the number of beams operating simultaneously in the cell.

For example, if the one or more candidate transmission cells include only cell 3, and then cell 3 is determined as the target handover cell. If the one or more candidate transmission cells include cell 3 and cell 4 whose signal strengths are 8.5 dBm and 10 dBm correspondingly, and then cell 4 whose signal strength is the maximum signal strength is determined as the target handover cell.

For another example, the one or more candidate transmission cells include cell 3 and cell 4 whose signal strengths are 8.5 dBm and 10 dBm correspondingly, the beam width of cell 3 is X3 and the number of beams operating simultaneously in cell 3 is three, and the beam width of cell 4 is X4 and the number of beams operating simultaneously in cell 4 is three, then signal feature value Z of the cell can be calculated according to the following formula (2).

$$Z = RSRQ * (X/360) * N \quad (2)$$

In formula (2), Z is defined as the signal feature value and RSRQ is defined as the signal strength of the cell. The signal strength of the cell may be one of a reference signal receiving power (RSRP), a reference signal receiving quality (RSRQ), and a received signal strength indication (RSSI). X is defined as the beam width of the cell. For example, each beam has a coverage area of 30 degrees, and then X is equal to 30 degrees. N is defined as the number of beams operating simultaneously in the cell. For example, two beams each having the coverage area of 30 degrees are configured to scan simultaneously, and a difference between the directions of the two beams is 180 degrees, such that each beam is responsible for scanning a range of 180 degrees, while a transmission power of each beam is half of a transmission power of the base station.

It is calculated that the signal feature values of cell 3 and cell 4 are Z3 and Z4 correspondingly. If Z4 is the maximum signal feature value, cell 4 to which the signal feature value Z4 corresponding is determined as the target handover cell.

In the embodiments of the present disclosure, the at least one beam signal and the signal strength of the at least one beam signal are acquired, and the one or more second candidate transmission beam are determined from the at least one beam signal, and the signal strengths of respective cells to which the one or more second candidate transmission beams belong are calculated. Thereafter, the at least one neighboring cell whose signal strength satisfies the second criterion is selected from the respective cells, the at least one neighboring cell is determined as the one or more candidate transmission cells, and the parameter information of each candidate transmission cell is transmitted to the serving base station. Finally, the parameter information of the target handover cell determined by the serving base station according to the parameter information of each candidate transmission cell is received. The target handover object is selected as a handover object of the communication link according to the signal strength of the at least one beam signal, and a fast and accurate handover of a multi-beam based communication link is realized.

Figure 4:
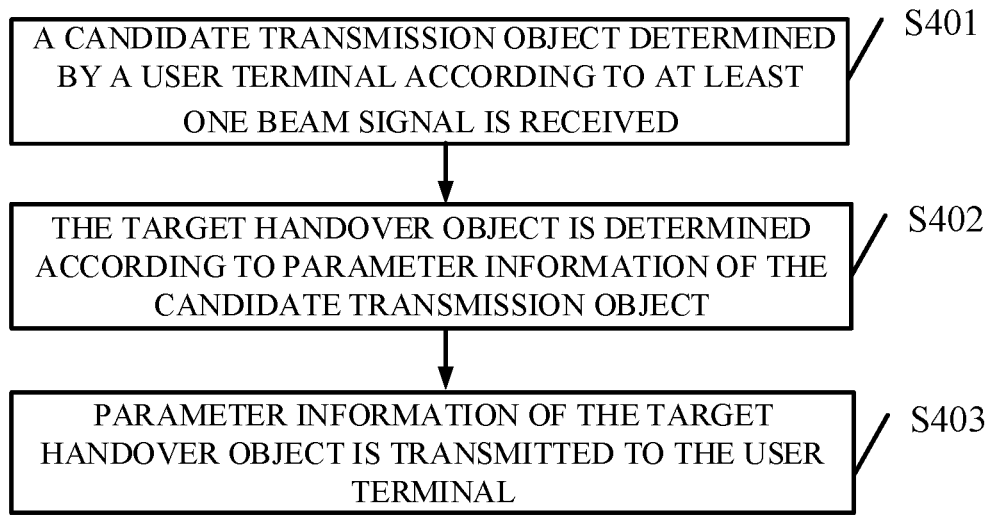
FIG. 4 is a schematic flow chart of still another method for beam-based mobility management according to an embodiment of the present disclosure.

FIG. 4 is a schematic flow chart of still another method for beam-based mobility management according to an embodiment of the present disclosure. Referring to FIG. 4, the method for beam-based mobility management begins at S401.

At S401, a candidate transmission object determined by a user terminal according to at least one beam signal is received.

In one embodiment, a serving base station receives the candidate transmission object determined by the user terminal according to the at least one beam signal. The candidate transmission object includes at least one of one or more first candidate transmission beams and one or more candidate transmission cells, and a target handover object includes at least one of a target handover cell and a target handover beam.

At S402, the target handover object is determined according to parameter information of the candidate transmission object.

In one embodiment, the serving base station determines the target handover object according to the parameter information of the candidate transmission object. In this embodiment, if the target handover object includes the one or more first candidate transmission beams, the serving base station can determine the target handover cell and the target handover beam as follows.

In one embodiment, the serving base station can select, from the one or more first candidate transmission beams, a beam signal whose signal parameter value is the maximum signal parameter value as the target handover beam according to parameter information of each of the one or more first candidate transmission beams, and select a cell to which the target handover beam belongs as the target handover cell. The signal parameter value includes one of a signal strength of the beam signal and a signal feature value of the beam signal, and the signal feature value of the beam signal is proportional to the signal strength of the beam signal, and a beam width of a cell to which the beam signal belongs and the number of beams operating simultaneously in the cell.

For example, the one or more first candidate transmission beams include beam 6 in cell 2, and beam 8 and beam 9 in cell 3. The signal strengths of beam 6, beam 8, and beam 9 are 6 dBm, 8 dBm, and 9 dBm correspondingly. In this case, beam 9 whose signal strength is the maximum signal strength is selected as the target handover beam, and cell 3 to which beam 9 belongs may be further selected as the target handover cell corresponding to the target handover beam.

For another example, the one or more first candidate transmission beams include beam 6 in cell 2, and beam 8 and beam 9 in cell 3. Assuming that the signal strengths of beam 6, beam 8, and beam 9 are 6 dBm, 8 dBm, and 9 dBm correspondingly, the beam width of cell 2 is X2 and the number of beams operating simultaneously in cell 2 is three, and the beam width of cell 3 is X3 and the number of beams operating simultaneously in cell 3 is three, then signal feature value Y of the beam signal can be calculated according to the following formula (1).

$$Y = RSRP*(X/360)*N \qquad (1)$$

In formula (1), Y is defined as the signal feature value and RSRP is defined as the signal strength of the beam signal. The signal strength of the beam signal may be one of a reference signal receiving power (RSRP), a reference signal receiving quality (RSRQ), and a received signal strength indication (RSSI). X is defined as the beam width of the cell. For example, each beam has a coverage area of 30 degrees, and then X is equal to 30 degrees. N is defined as the number of beams operating simultaneously in the cell. For example, two beams each having the coverage area of 30 degrees are configured to scan simultaneously, and a difference between the directions of the two beams is 180 degrees, such that each beam is responsible for scanning a range of 180 degrees, while a transmission power of each beam is half of a transmission power of the base station.

It is calculated that the signal feature values of beam 6, beam 8, and beam 9 are Y1, Y2, and Y3 correspondingly. If Y2 is the maximum signal feature value, beam 8 corresponding to signal feature value Y2 is determined as the target handover beam, and cell 3 to which beam 8 belongs is further determined as the target handover cell corresponding to the target handover beam.

In another embodiment, the serving base station can determine the target handover beam according to the parameter information of each first candidate transmission beam. The serving base station may acquire cell parameter values of respective cells to which the one or more first candidate transmission beams belong according to average values or weighted average values of signal parameter values of all beam signals in the respective cells to which the one or more first candidate transmission beams belong, and determine a cell whose cell parameter value is the maximum cell parameter value from the cells to which the one or more first candidate transmission beams belong as the target handover cell, and further determine a beam signal whose signal parameter value is the maximum signal parameter value in the target handover cell as the target handover beam. The signal parameter value includes one of the signal strength of the beam signal and the signal feature value of the beam signal, and the signal feature value of the beam signal is proportional to the signal strength of the beam signal, and the beam width of the cell to which the beam signal belongs and the number of beams operating simultaneously in the cell.

In this embodiment, when a signal strength of a cell is calculated according to signal strengths of multiple beam signals, different weights can be assigned to signal strengths of different beams in the cell. A greater signal strength results in a greater weight, and the sum of all weights is equal to one. How weights are assigned is related to a coverage angle of each beam. For example, the weight of the greatest signal strength is represented as x, the weights of one or two second greatest signal strengths are represented as x−delta 1 (that is, x minus delta 1), the weights of one or two third greatest signal strengths are represented as x−delta 1−delta 2 (that is, x minus delta 1 and delta 2), and so on, so that more possible delta_i can be determined according to the number n' of the beam signals, where i is less than n'. If the beam width of each cell is different, the value of delta_i may differ depending on the cells and be proportional to the coverage angle of the respective beam. In one embodiment, the value of delta_i of the serving cell or each of at least one neighboring cell of the serving base station is determined by the serving base station, and the value of delta_i of each of at least one neighboring cell of each neighboring base station is acquired in the following two modes. In the first mode, the serving base station acquires, from each neighboring base station, the value of delta_i of each of the at least one neighboring cell of the respective neighboring base station through an interface(s) between the serving base station and the respective neighboring base station. In the second mode, the user terminal acquires the value of delta_i of each of the at least one neighboring cell of the respective neighboring base station through receiving system information of the respective neighboring base station and transmits the value of delta_i together with the parameter information of each first candidate transmission beam to the serving base station.

For example, the one or more first candidate transmission beams include beam 6 in cell 2, beam 8 and beam 9 in cell 3, and the signal strengths of beam 6, beam 8, and beam 9 are 6 dBm, 8 dBm, and 9 dBm correspondingly. It is calculated that the average value of the signal strengths of the beams in cell 2 is 6 dBm, and the average value of the signal strengths of the beams in cell 3 is 8.5 dBm. By comparison, cell 3 is determined as the target handover cell, and beam 9 whose signal strength is the maximum signal strength in the target handover cell is further determined as the target handover beam. In this embodiment, the signal strength can also be replaced by other signal parameters such as the signal feature value.

For example, the one or more first candidate transmission beams include beam 6 in cell 2, beam 8 and beam 9 in cell 3, the signal strengths of beam 6, beam 8, and beam 9 are 6 dBm, 8 dBm, and 9 dBm correspondingly, and both cell 2 and cell 3 have three beam signals. Assuming that the weight of the beam signal whose signal strength is the maximum signal strength in each cell is represented as x and the sum of the weights of all beam signals in each cell is one, then the weight of beam 6 is one, the weight of beam 8 is represented as [(1−delta 1)/2], and the weight of beam 9 is represented as (1+delta 1)/2. It is calculated that the weighted average value of the signal strengths of the beam signals in cell 2 is 6 dBm, and the weighted average value of the signal strengths of the beam signals in cell 3 is [(17+delta 1)/2] dBm. Comparing the two weighted average values, the cell whose weighted average value is the maximum weighted average value is determined as the target handover cell, and the beam signal whose signal strength is the maximum signal strength in the target handover cell is determined as the target handover beam.

In another embodiment, the serving base station can select, from the one or more candidate transmission cells, a cell whose cell parameter value is the maximum cell parameter value as the target handover cell according to the parameter information of each of the one or more candidate transmission cells. The cell parameter value includes one of the signal strength of the cell and the signal feature value of the cell, and the signal feature value of the cell is proportional to the signal strength of the cell, the beam width of the cell, and the number of beams operating simultaneously in the cell.

For example, if the one or more candidate transmission cells include only cell 3, cell 3 is determined as the target handover cell. If the one or more candidate transmission cells include cell 3 and cell 4 whose signal strengths are 8.5 dBm and 10 dBm correspondingly, cell 4 whose signal strength is the maximum signal strength is determined as the target handover cell.

For another example, the one or more candidate transmission cells include cell 3 and cell 4 whose signal strengths are 8.5 dBm and 10 dBm correspondingly, the beam width of cell 3 is X3 and the number of beams operating simultaneously in cell 3 is three, and the beam width of cell 4 is X4 and the number of beams operating simultaneously in cell 4 is three, then signal feature value Z of the cell can be calculated according to the following formula (2).

$$Z=RSRQ*(X/360)*N \qquad (2)$$

In formula (2), Z is defined as the signal feature value and RSRQ is defined as the signal strength of the cell. The signal strength of the cell may be one of the RSRP, the RSRQ and the RSSI. X is defined as the beam width of the cell. For example, each beam has a coverage area of 30 degrees, and then X is equal to 30 degrees. N is defined as the number of beams operating simultaneously in the cell. For example, two beams each having the coverage area of 30 degrees are configured to scan simultaneously, and a difference between the directions of the two beams is 180 degrees, such that each beam is responsible for scanning a range of 180 degrees, while a transmission power of each beam is half of a transmission power of the base station.

It is calculated that the signal feature values of cell 3 and cell 4 are Z3 and Z4 correspondingly. If Z4 is the maximum signal feature value, and cell 4 to which the signal feature value Z4 corresponding is determined as the target handover cell.

In the embodiments of the present disclosure, the serving base station can acquire the beam configuration information of each neighboring base station in the following two modes. In the first mode, the serving base station receives the beam configuration information of each neighboring base station directly transmitted by the respective neighboring base station. In the second mode, the serving base station receives the beam configuration information of each neighboring base station acquired by the user terminal. The user terminal can acquire the beam configuration information of each neighboring base station through any one of the following manners. The user terminal receives one of a primary synchronization signal (PSS) and a secondary synchronization signal (SSS) carrying beam configuration information of a cell to which each of the at least one beam signal belongs from each neighboring base station. The user terminal receives a physical broadcast channel (PBCH) carrying the beam configuration information of the cell to which each of the at least one beam signal belongs from each neighboring base station. The user terminal receives a system information block (SIB) message carrying the beam configuration information of the cell to which each of the at least one beam signal belongs from each neighboring base station.

At S403, parameter information of the target handover object is transmitted to the user terminal.

In one embodiment, the serving base station transmits the parameter information of the target handover object to the user terminal. In this embodiment, the parameter information of the target handover object includes parameter information of the target handover beam and/or parameter information of the target handover cell. The parameter information of the target handover beam includes cell identification information of the cell to which the target handover beam belongs and identification information of the target handover beam. The parameter information of the target handover cell includes cell identifier information of the target handover cell.

In the embodiments of the present disclosure, the candidate transmission object determined by the user terminal according to the signal strength of each of the at least one beam signal is received. Thereafter, the target handover object is determined according to the parameter information of the candidate transmission object. Finally, the parameter information of the target handover object is transmitted to the user terminal. By comparing the signal strength of the at least one beam signal, the most suitable timing for handovering communication link and the best communication link handover object are determined, and a fast and accurate handover of a multi-beam based communication link is realized.

Figure 5:
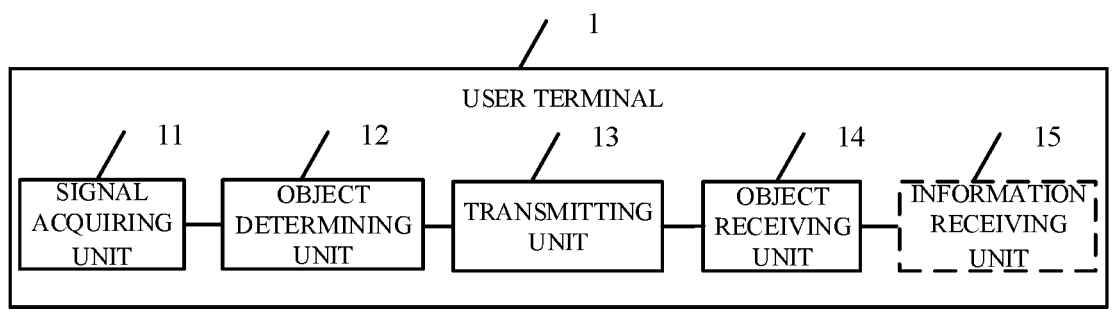
FIG. 5 is a schematic structural diagram of a user terminal according to an embodiment of the present disclosure.
Figure 6:
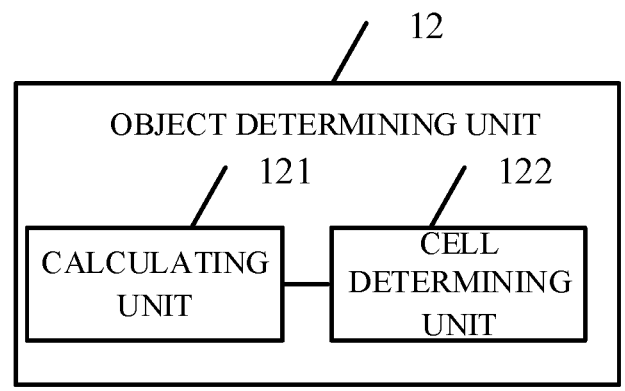
FIG. 6 is a schematic structural diagram of an object determining unit according to an embodiment of the present disclosure.
Figure 7:
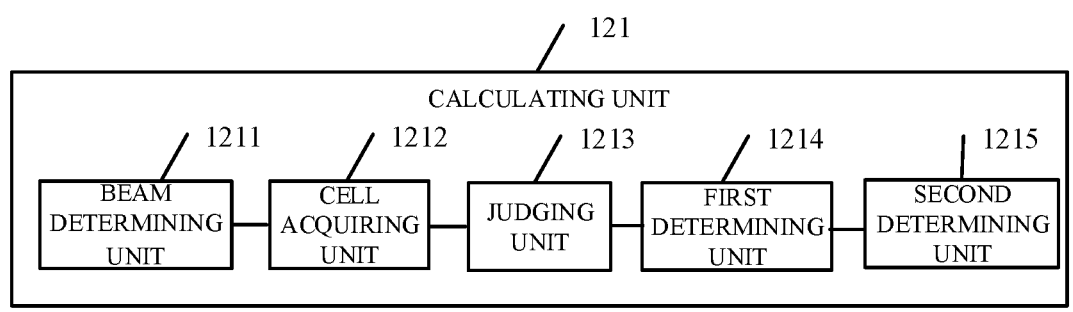
FIG. 7 is a schematic structural diagram of a calculating unit according to an embodiment of the present disclosure.

FIG. 5 is a schematic structural diagram of a user terminal according to an embodiment of the present disclosure. FIG. 6 is a schematic structural diagram of an object determining unit according to an embodiment of the present disclosure. FIG. 7 is a schematic structural diagram of a calculating unit according to an embodiment of the present disclosure. Referring to FIG. 5, the user terminal 1 according to the embodiments of the present disclosure includes a signal acquiring unit 11, an object determining unit 12, a transmitting unit 13, and an object receiving unit 14.

The signal acquiring unit 11 is configured to acquire at least one beam signal and a signal strength of the at least one beam signal.

The object determining unit 12 is configured to determine a candidate transmission object according to the signal strength of the at least one beam signal.

The transmitting unit 13 is configured to transmit parameter information of the candidate transmission object to a serving base station.

The object receiving unit 14 is configured to receive parameter information of a target handover object determined by the serving base station according to the parameter information of the candidate transmission object.

In one embodiment, the candidate transmission object includes at least one of one or more first candidate transmission beams and one or more candidate transmission cells, and the target handover object includes at least one of a target handover cell and a target handover beam.

The at least one beam signal includes at least one neighboring beam signal and a current serving beam signal. The at least one neighboring beam signal includes at least one of beam signals in at least one neighboring cell and beam signals other than the current serving beam signal in a serving cell. The serving cell is a cell to which the current serving beam signal belongs, and the at least one neighboring cell is a cell neighboring the serving cell.

In one embodiment, the object determining unit 12 is configured to select one or more neighboring beam signals from the at least one neighboring beam signal as the one or more first candidate transmission beams, each of the one or more neighboring beam signals has a signal strength satisfying a first criterion and the one or more neighboring beam signals are top N neighboring beam signals in descending order of signal strength in respective cells to which the one or more neighboring beam signals belong.

In one embodiment, the first criterion includes one of the following. A difference between a signal strength of the current serving beam signal and a signal strength of the neighboring beam signal is greater than a first offset value. The signal strength of the neighboring beam signal is greater than a first threshold value. The signal strength of the neighboring beam signal is greater than a second threshold value and the signal strength of the current serving beam signal is less than a third threshold value.

FIG. 6 is a schematic structural diagram of the object determining unit according to an embodiment of the present disclosure. The object determining unit 12 includes a calculating unit 121 and a cell determining unit 122.

The calculating unit 121 is configured to determine one or more second candidate transmission beams from the at least one beam signal, and to calculate signal strengths of respective cells to which the one or more second candidate transmission beams belong.

The cell determining unit 122 is configured to select, from the respective cells, at least one neighboring cell whose signal strength satisfies a second criterion, and to determine the at least one neighboring cell as the one or more candidate transmission cells.

In one embodiment, the second criterion includes one of the following. A difference between a signal strength of the serving cell and a signal strength of the neighboring cell is greater than a second offset value. The signal strength of the neighboring cell is greater than a fourth threshold value. The signal strength of the neighboring cell is greater than a fifth threshold and the signal strength of the serving cell is less than a sixth threshold value.

FIG. 7 is a schematic structural diagram of the calculating unit according to an embodiment of the present disclosure. The calculating unit 121 includes a beam determining unit 1211, a cell acquiring unit 1212, a judging unit 1213, a first determining unit 1214, and a second determining unit 1215.

The beam determining unit 1211 is configured to select, from the at least one neighboring beam signal, one or more neighboring beam signals whose signal strengths satisfy a third criterion and to determine the one or more neighboring beam signals selected as the one or more second candidate transmission beams.

The cell acquiring unit 1212 is configured to acquire at least one target cell to which the one or more second candidate transmission beams belong.

The judging unit 1213 is configured to determine whether the number of the one or more second candidate transmission beams in each of the at least one target cell is greater than M.

The first determining unit 1214 is configured to determine a target cell as a first target cell upon determining that the number of the one or more second candidate transmission beams in the target cell is less than or equal to M, and a signal strength of the first target cell is an average value or weighted average value of signal strengths of the one or more second candidate transmission beams in the first target cell.

The second determining unit 1215 is configured to determine a target cell as a second target cell upon determining that the number of the one or more second candidate transmission beams in the target cell is greater than M, and a signal strength of the second target cell is an average value or weighted average value of signal strengths of top M second candidate transmission beams in descending order of signal strength in the target cell.

In one embodiment, the third criterion includes one of the following. A difference between the signal strength of the current serving beam signal and the signal strength of the neighboring beam signal is greater than a third offset value. The signal strength of the neighboring beam signal is greater than a seventh threshold value. The signal strength of the neighboring beam signal is greater than an eighth threshold and the signal strength of the current serving beam signal is less than a ninth threshold value.

In one embodiment, a value of N is determined according to one of the following. Radio resource control (RRC) configuration information or system information of the serving base station. Beam configuration information of respective cells to which the one or more first candidate transmission beams belong.

In one embodiment, a value of M is determined according to one of the following. Radio resource control (RRC) configuration information or system information of the serving base station. Beam configuration information of the respective cells to which the one or more second candidate transmission beams belong.

In one embodiment, parameter information of each first candidate transmission beam includes cell identification information of a cell to which the respective first candidate transmission beam belongs, identification information of the respective first candidate transmission beam, and a signal strength of the respective first candidate transmission beam. Parameter information of each candidate transmission cell includes cell identification information and a signal strength of the respective candidate transmission cell.

In one embodiment, the parameter information of each first candidate transmission beam further includes beam configuration information of the cell to which the respective first candidate transmission beam belongs, and the beam configuration information includes the number of beams operating simultaneously and a beam width of the cell to which the respective first candidate transmission beam belongs. The parameter information of each candidate transmission cell further includes beam configuration information of the respective candidate transmission cell, and the beam configuration information includes the number of beams operating simultaneously and the beam width of the respective candidate transmission cell.

In one embodiment, the user terminal further includes an information receiving unit 15. The information receiving unit 15 is configured to receive one of the following transmitted from each neighboring base station. A primary synchronization signal (PSS) or a secondary synchronization signal (SSS) carrying beam configuration information of a cell to which each of the at least one beam signal belongs. A physical broadcast channel (PBCH) carrying the beam configuration information of the cell to which each of the at least one beam signal belongs. A system information block (SIB) message carrying the beam configuration information of the cell to which each of the at least one beam signal belongs.

The user terminal according to the embodiments of the present disclosure is configured to carry out actions or steps of the user terminal in any of the embodiments illustrated in FIGS. 5-7. The technical effects brought by the user terminal refer to the specific description of the corresponding method embodiments, and are not described herein.

Figure 8:
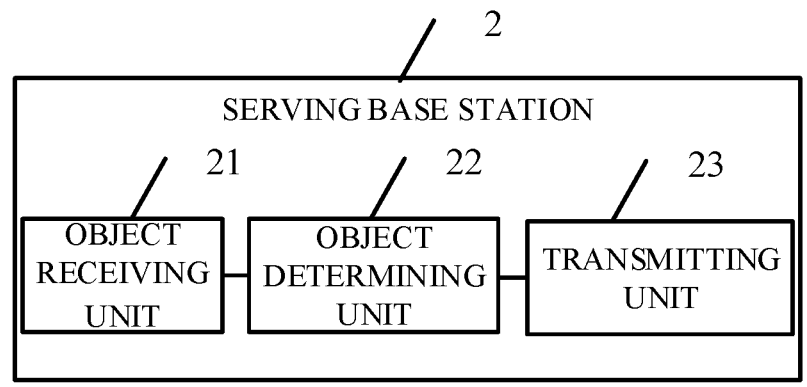
FIG. 8 is a schematic structural diagram of a serving base station according to an embodiment of the present disclosure.
Figure 9:
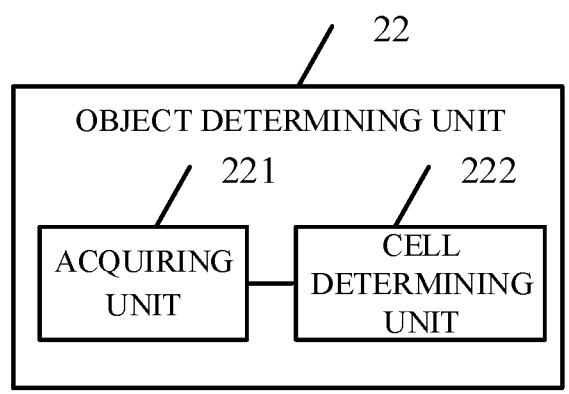
FIG. 9 is a schematic structural diagram of an object determining unit according to an embodiment of the present disclosure.

FIG. 8 is a schematic structural diagram of a serving base station according to an embodiment of the present disclosure. FIG. 9 is a schematic structural diagram of an object determining unit according to an embodiment of the present disclosure. Referring to FIG. 8, the serving base station 2 according to the embodiments to the present disclosure includes an object receiving unit 21, an object determining unit 22, and a transmitting unit 23.

The object receiving unit 21 is configured to receive a candidate transmission object, and the candidate transmission object is determined by a user terminal according to at least one beam signal.

The object determining unit 22 is configured to determine a target handover object according to parameter information of the candidate transmission object.

The transmitting unit 23 is configured to transmit parameter information of the target handover object to the user terminal.

In one embodiment, the candidate transmission object includes at least one of the one or more first candidate transmission beams and one or more candidate transmission cells. The target handover object includes at least one of the target handover cell and the target handover beam.

In one embodiment, the parameter information of each first candidate transmission beam includes cell identification information of a cell to which the respective first candidate transmission beam belongs, identification information of the respective first candidate transmission beam, and a signal strength of the respective first candidate transmission beam. Parameter information of each candidate transmission cell includes cell identification information and a signal strength of the respective candidate transmission cell.

In one embodiment, the parameter information of each first candidate transmission beam further includes the number of beams operating simultaneously and a beam width of a cell to which the respective first candidate transmission beam. The parameter information of each candidate transmission cell further includes the number of beams operating simultaneously and a beam width of the respective candidate transmission cell.

In one embodiment, the object determining unit 22 is configured to select, from one or more first candidate transmission beams, a beam signal whose signal parameter value is the maximum signal parameter value as the target handover beam according to the parameter information of each of the one or more first candidate transmission beams, and to select a cell to which the target handover beam belongs as a target handover cell. The signal parameter value includes one of a signal strength of the beam signal and a signal feature value of the beam signal, and the signal feature value of the beam signal is proportional to the signal strength of the beam signal, and a beam width of a cell to which the beam signal belongs and the number of beams operating simultaneously in the cell.

FIG. 9 is a schematic structural diagram of the object determining unit according to an embodiment of the present disclosure. The object determining unit 22 includes an acquiring unit 221 and a cell determining unit 222.

The acquiring unit 221 is configured to acquire cell parameter values of respective cells to which the one or more first candidate transmission beams belong according to average values or weighted average values of signal parameter values of all beam signals in the respective cells to which the one or more first candidate transmission beams belong.

The cell determining unit 222 is configured to determine, from the cells to which the one or more first candidate transmission beams belong, a cell whose cell parameter value is the maximum cell parameter value as the target handover cell, and further to determine a beam signal whose signal parameter value is the maximum signal parameter value in the target handover cell as the target handover beam.

The signal parameter value includes one of the signal strength of the beam signal and the signal feature value of the beam signal, and the signal feature value of the beam signal is proportional to the signal strength of the beam signal, and the beam width of the cell to which the beam signal belongs and the number of beams operating simultaneously in the cell.

The object determining unit 22 is configured to select, from the one or more candidate transmission cells, a cell whose cell parameter value is the maximum cell parameter value as the target handover cell according to the parameter information of each of the one or more candidate transmission cells. The cell parameter value includes one of a signal strength of the cell and a signal feature value of the cell, and the signal feature value of the cell is proportional to the signal strength of the cell, the beam width of the cell, and the number of beams operating simultaneously in the cell.

In one embodiment, the parameter information of the target handover object includes parameter information of the target handover beam and/or parameter information of the target handover cell. The parameter information of the target handover beam includes cell identification information of the cell to which the target handover beam belongs and identification information of the target handover beam. The parameter information of the target handover cell includes cell identifier information of the target handover cell.

In one embodiment, the serving base station further includes an information receiving unit. The information receiving unit is configured to receive the beam configuration information of the cell to which each of the at least one beam signal belongs, and each of the at least one beam signal is transmitted by the respective neighboring base station.

The serving base station according to the embodiments of the present disclosure is configured to carry out actions or steps of the serving base station in any of the embodiments illustrated in FIGS. 8-9. The technical effects brought by the serving base station refer to the specific description of the corresponding method embodiments, and are not described herein.

Figure 10:
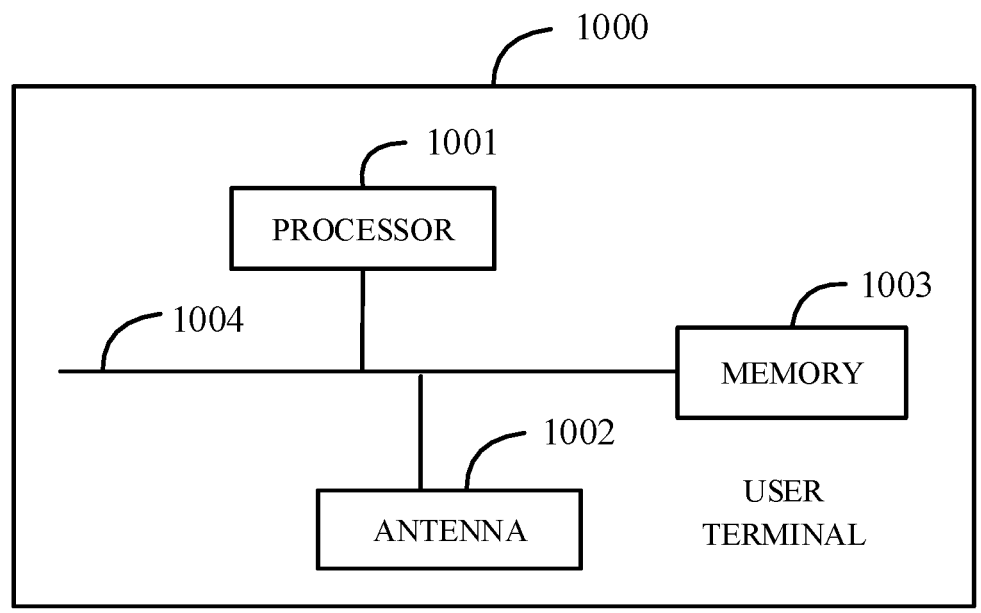
FIG. 10 is a schematic structural diagram of another user terminal according to an embodiment of the present disclosure.

FIG. 10 is a schematic structural diagram of a user terminal according to an embodiment of the present disclosure. As illustrated in FIG. 10, the user terminal 1000 may include at least one processor 1001 (such as a CPU), at least one antenna 1002, a memory 1003, and at least one communication bus 1004. The at least one communication bus 1004 is configured to implement connection communication between these components. The at least one antenna 1002 is configured to transmit and receive information, and the memory 1003 may include a high-speed random access memory (RAM), and may also include a non-volatile memory such as at least one disk storage device. The memory 1003 can optionally include at least one storage device located remote from the processor 1001.

As one embodiment, the processor 1001 is configured to call programs stored in the memory 1003 to carry out actions, including: acquiring at least one beam signal and a signal strength of the at least one beam signal; determining a candidate transmission object according to the signal strength of the at least one beam signal; transmitting parameter information of the candidate transmission object to a serving base station; and receiving parameter information of a target handover object determined by the serving base station according to the parameter information of the candidate transmission object.

In one embodiment, the candidate transmission object includes at least one of one or more first candidate transmission beams and one or more candidate transmission cells. The target handover object includes at least one of a target handover cell and a target handover beam.

In one embodiment, the at least one beam signal includes at least one neighboring beam signal and a current serving beam signal. The at least one neighboring beam signal includes at least one of beam signals in at least one neighboring cell and beam signals other than the current serving beam signal in a serving cell. The serving cell is a cell to which the current serving beam signal belongs, and the at least one neighboring cell is a cell neighboring the serving cell.

In one embodiment, in terms of determining the one or more first candidate transmission beams according to the signal strength of the at least one beam signal, the processor 1001 is configured to: select one or more neighboring beam signals from the at least one neighboring beam signal as the one or more first candidate transmission beams, and each of the one or more neighboring beam signals has a signal strength satisfying a first criterion and the one or more neighboring beam signals are top N neighboring beam signals in descending order of signal strength in respective cells to which the one or more neighboring beam signals belong.

In one embodiment, the first criterion includes one of the following. A difference between a signal strength of the current serving beam signal and a signal strength of the neighboring beam signal is greater than a first offset value. The signal strength of the neighboring beam signal is greater than a first threshold value. The signal strength of the neighboring beam signal is greater than a second threshold value and the signal strength of the current serving beam signal is less than a third threshold value.

In one embodiment, in terms of determining the one or more candidate transmission cells according to the signal strength of the at least one beam signal, the processor 1001 is configured to: determine, from the at least one beam signal, one or more second candidate transmission beam, and calculate signal strengths of respective cells to which the one or more second candidate transmission beams belong; select, from the respective cells, at least one neighboring cell whose signal strength satisfies a second criterion; and determine the at least one neighboring cell as the one or more candidate transmission cells.

In one embodiment, the second criterion includes one of the following. A difference between a signal strength of the serving cell and a signal strength of the neighboring cell is greater than a second offset value. The signal strength of the neighboring cell is greater than a fourth threshold value. The signal strength of the neighboring cell is greater than a fifth threshold and the signal strength of the serving cell is less than a sixth threshold value.

In one embodiment, in terms of determining, from the at least one beam signal, the one or more second candidate transmission beams, and calculating the signal strengths of respective cells to which the one or more second candidate transmission beams belong, the processor 1001 is configured to: select, from the at least one neighboring beam signal, one or more neighboring beam signals whose signal strengths satisfy a third criterion, and determine the one or more neighboring beam signals selected as the one or more second candidate transmission beams; acquire at least one target cell to which the one or more second candidate transmission beams belong; determine whether the number of the one or more second candidate transmission beams in each of the at least one target cell is greater than M; determine a target cell as a first target cell upon determining that the number of the one or more second candidate transmission beams in the target cell is less than or equal to M, and a signal strength of the first target cell is an average value or weighted average value of signal strengths of the one or more second candidate transmission beams in the first target cell; and determine a target cell as a second target cell upon determining that the number of the one or more second candidate transmission beams in the target cell is greater than M, and a signal strength of the second target cell is an average value or weighted average value of signal strengths of top M second candidate transmission beams in descending order of signal strength in the target cell.

In one embodiment, the third criterion includes one of the following. A difference between the signal strength of the current serving beam signal and the signal strength of the neighboring beam signal is greater than a third offset value. The signal strength of the neighboring beam signal is greater than a seventh threshold value. The signal strength of the neighboring beam signal is greater than an eighth threshold and the signal strength of the current serving beam signal is less than a ninth threshold value.

In one embodiment, a value of N is determined according to one of the following. Radio resource control (RRC) configuration information or system information of the serving base station. Beam configuration information of respective cells to which the one or more first candidate transmission beams belong.

In one embodiment, a value of M is determined according to one of the following. Radio resource control (RRC) configuration information or system information of the serving base station. Beam configuration information of the respective cells to which the one or more second candidate transmission beams belong.

In one embodiment, parameter information of each first candidate transmission beam includes cell identification information of a cell to which the respective first candidate transmission beam belongs, identification information of the respective first candidate transmission beam, and a signal strength of the respective first candidate transmission beam. Parameter information of each candidate transmission cell includes cell identification information and a signal strength of the respective candidate transmission cell.

In one embodiment, the parameter information of each first candidate transmission beam further includes beam configuration information of the cell to which the respective first candidate transmission beam belongs, and the beam configuration information includes the number of beams operating simultaneously and a beam width of the cell to which the respective first candidate transmission beam belongs. The parameter information of each candidate transmission cell further includes beam configuration information of the respective candidate transmission cell, and the beam configuration information includes the number of beams operating simultaneously and the beam width of the respective candidate transmission cell.

In one embodiment, the processor 1001 is further configured to: receive, from each neighboring base station, one of a primary synchronization signal (PSS) and a secondary synchronization signal (SSS) carrying beam configuration information of a cell to which each of the at least one beam signal belongs; or receive, from each neighboring base station, a physical broadcast channel (PBCH) carrying the beam configuration information of the cell to which each of the at least one beam signal belongs; or receive, from each neighboring base station, a system information block (SIB) message carrying the beam configuration information of the cell to which each of the at least one beam signal belongs.

The user terminal according to the embodiments of the present disclosure is configured to carry out actions or steps of the user terminal in any of the embodiments illustrated in FIG. 10. The technical effects brought by the user terminal refer to the specific description of the corresponding method embodiments, and are not described herein.

Figure 11:
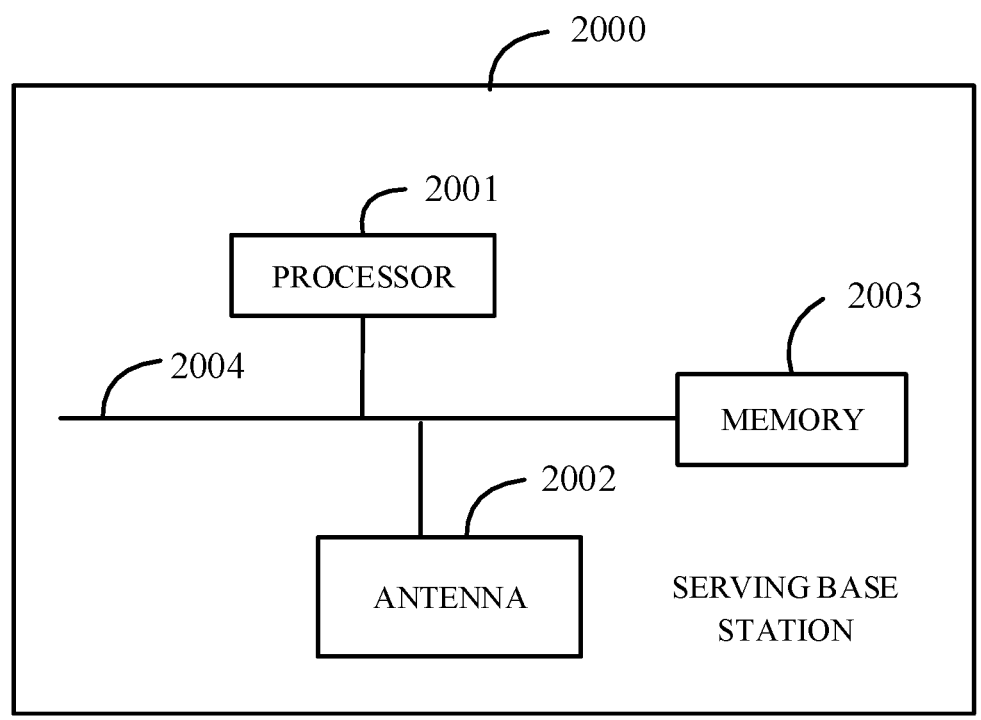
FIG. 11 is a schematic structural diagram of another serving base station according to an embodiment of the present disclosure.

FIG. 11 is a schematic structural diagram of a serving base station according to an embodiment of the present disclosure. As illustrated in FIG. 11, the serving base station 2000 may include at least one processor 2001 (such as a CPU), at least one antenna 2002, a memory 2003, and at least one communication bus 2004. The at least one communication bus 2004 is configured to implement connection communication between these components. The at least one antenna 2002 is configured to transmit and receive information, and the memory 2003 may include a high-speed random access memory (RAM), and may also include a non-volatile memory such as at least one disk storage device. The memory 2003 can optionally include at least one storage device located remote from the processor 2001.

As one embodiment, the processor 2001 is configured to call programs stored in the memory 2003 to carry out actions, including: receiving a candidate transmission object, and the candidate transmission object is determined by a user terminal according to at least one beam signal; determining a target handover object according to parameter information of the candidate transmission object; and transmitting parameter information of the target handover object to the user terminal.

As one embodiment, in terms of determining the target handover object according to the parameter information of the candidate transmission object, the processor 2001 is configured to select, from one or more first candidate transmission beams, a beam signal whose signal parameter value is the maximum signal parameter value as the target handover beam according to parameter information of each of the one or more first candidate transmission beams, and to select a cell to which the target handover beam belongs as a target handover cell. The candidate transmission object includes at least one of the one or more first candidate transmission beams and one or more candidate transmission cells, and the target handover object includes at least one of the target handover cell and the target handover beam. The parameter information of each first candidate transmission beam includes cell identification information of a cell to which the respective first candidate transmission beam belongs, identification information of the respective first candidate transmission beam, and a signal strength of the respective first candidate transmission beam, and parameter information of each candidate transmission cell includes cell identification information and a signal strength of the respective candidate transmission cell. The signal parameter value includes one of a signal strength of the beam signal and a signal feature value of the beam signal, and the signal feature value of the beam signal is proportional to the signal strength of the beam signal, and a beam width of a cell to which the beam signal belongs and the number of beams operating simultaneously in the cell.

In one embodiment, in terms of determining the target handover object according to the parameter information of the candidate transmission object, the processor 2001 is configured to: acquire cell parameter values of respective cells to which the one or more first candidate transmission beams belong according to average values or weighted average values of signal parameter values of all beam signals in the respective cells to which the one or more first candidate transmission beams belong; and determine a cell whose cell parameter value is the maximum cell parameter value from the cells to which the one or more first candidate transmission beams belong as the target handover cell, and further determine a beam signal whose signal parameter value is the maximum signal parameter value in the target handover cell as the target handover beam. The signal parameter value includes one of the signal strength of the beam signal and the signal feature value of the beam signal, and the signal feature value of the beam signal is proportional to the signal strength of the beam signal, and the beam width of the cell to which the beam signal belongs and the number of beams operating simultaneously in the cell.

In one embodiment, in terms of determining the target handover object according to the parameter information of the candidate transmission object, the processor 2001 is configured to select, from the one or more candidate transmission cells, a cell whose cell parameter value is the maximum cell parameter value as the target handover cell according to the parameter information of each of the one or more candidate transmission cells. The cell parameter value includes one of a signal strength of the cell and a signal feature value of the cell, and the signal feature value of the cell is proportional to the signal strength of the cell, the beam width of the cell, and the number of beams operating simultaneously in the cell.

The serving base station according to the embodiments of the present disclosure is configured to carry out actions or steps of the serving base station in any of the embodiments illustrated in FIG. 11. The technical effects brought by the serving base station refer to the specific description of the corresponding method embodiments, and are not described herein.

It can be understood by those skilled in the art that the whole or parts of the process of the method in the above embodiment can be realized by computer program instructing related hardware, the computer program is stored in a computer readable storage medium, when the computer program is executed, it can include such as process of the embodiment of the above each method. The computer-readable storage medium may include a disk, a compact disc (CD), a read-only memory (ROM), or a random-access memory (RAM), and so on.

The above description is only the preferred embodiments of the present disclosure and is not intended to limit the protection scope of the present disclosure, and thus equivalent changes made according to the claims of the present disclosure are still within the scope of the present disclosure.

What is claimed is:

1. A method for beam-based mobility management by a user terminal, the method comprising:
   acquiring at least one beam signal and a signal strength of the at least one beam signal;
   determining a candidate transmission object according to the signal strength of the at least one beam signal;
   transmitting parameter information of the candidate transmission object to a serving base station, wherein the parameter information of the candidate transmission object comprises beam configuration information of the at least one beam signal, the beam configuration information of the at least one beam signal comprising a beam width of a cell to which the at least one beam signal belongs and a number of beams operating simultaneously in the cell; and
   receiving parameter information of a target handover object determined by the serving base station according to the parameter information of the candidate transmission object, wherein the candidate transmission object comprises at least one of one or more first candidate transmission beams and one or more candidate transmission cells, and the target handover object comprises at least one of a target handover cell and a target handover beam;

wherein the at least one beam signal comprises at least one neighboring beam signal and a current serving beam signal;

wherein the at least one neighboring beam signal comprises at least one of beam signals in at least one neighboring cell and beam signals other than the current serving beam signal in a serving cell;

wherein the serving cell is a cell to which the current serving beam signal belongs, and the at least one neighboring cell is a cell neighboring the serving cell;

wherein determining the one or more candidate transmission cells according to the signal strength of the at least one beam signal comprises:
  determining, from the at least one beam signal, one or more second candidate transmission beams, and calculating signal strengths of respective cells to which the one or more second candidate transmission beams belong;
  selecting, from the respective cells, at least one neighboring cell whose signal strength satisfies a second criterion; and
  determining the at least one neighboring cell as the one or more candidate transmission cells;

wherein the second criterion comprises one of:
  a difference between a signal strength of the serving cell and a signal strength of the neighboring cell is greater than a second offset value;
  the signal strength of the neighboring cell is greater than a fourth threshold value; and
  the signal strength of the neighboring cell is greater than a fifth threshold and the signal strength of the serving cell is less than a sixth threshold value; and wherein determining, from the at least one beam signal, the one or more second candidate transmission beams, and calculating the signal strengths of respective cells to which the one or more second candidate transmission beams belong comprises:
  selecting, from the at least one neighboring beam signal, one or more neighboring beam signals whose signal strengths satisfy a third criterion, and determining the one or more neighboring beam signals selected as the one or more second candidate transmission beams;
  acquiring at least one target cell to which the one or more second candidate transmission beams belong;
  determining whether a number of the one or more second candidate transmission beams in each of the at least one target cell is greater than M;
  determining one of the at least one target cell as a first target cell upon determining that the number of the one or more second candidate transmission beams in the one of the at least one target cell is less than or equal to M, wherein a signal strength of the first target cell is an average value or weighted average value of signal strengths of the one or more second candidate transmission beams in the first target cell; and
  determining another one of the at least one target cell as a second target cell upon determining that the number of the one or more second candidate transmission beams in the another one of the at least one target cell is greater than M, wherein a signal strength of the second target cell is an average value or weighted average value of signal strengths of top M second candidate transmission beams in descending order of signal strength in the second target cell.

2. The method of claim 1, wherein determining the one or more first candidate transmission beams according to the signal strength of the at least one beam signal comprises:
  selecting one or more neighboring beam signals from the at least one neighboring beam signal as the one or more first candidate transmission beams, wherein each of the one or more neighboring beam signals has a signal strength satisfying a first criterion and the one or more neighboring beam signals are top N neighboring beam signals in descending order of signal strength in respective cells to which the one or more neighboring beam signals belong.

3. The method of claim 2, wherein the first criterion comprises one of:
  a difference between a signal strength of the current serving beam signal and a signal strength of the neighboring beam signal is greater than a first offset value;
  the signal strength of the neighboring beam signal is greater than a first threshold value; and
  the signal strength of the neighboring beam signal is greater than a second threshold value and the signal strength of the current serving beam signal is less than a third threshold value.

4. The method of claim 1, wherein the third criterion comprises one of:
  a difference between the signal strength of the current serving beam signal and the signal strength of the neighboring beam signal is greater than a third offset value;
  the signal strength of the neighboring beam signal is greater than a seventh threshold value; and
  the signal strength of the neighboring beam signal is greater than an eighth threshold and the signal strength of the current serving beam signal is less than a ninth threshold value.

5. The method of claim 1, wherein:
parameter information of each first candidate transmission beam comprises cell identification information of a cell to which the respective first candidate transmission beam belongs, identification information of the respective first candidate transmission beam, and a signal strength of the respective first candidate transmission beam; and
parameter information of each candidate transmission cell comprises cell identification information and a signal strength of the respective candidate transmission cell.

6. The method of claim 5, wherein:
the parameter information of each first candidate transmission beam further comprises beam configuration information of the cell to which the respective first candidate transmission beam belongs, and the beam configuration information comprises a number of beams operating simultaneously and a beam width of the cell to which the respective first candidate transmission beam belongs; and
the parameter information of each candidate transmission cell further comprises beam configuration information of the respective candidate transmission cell, and the beam configuration information comprises the number of beams operating simultaneously and the beam width of the respective candidate transmission cell.

7. The method of claim 6, further comprising one of:
receiving, from each neighboring base station, one of a primary synchronization signal and a secondary synchronization signal carrying beam configuration information of a cell to which each of the at least one beam signal belongs;
receiving, from each neighboring base station, a physical broadcast channel carrying the beam configuration information of the cell to which each of the at least one beam signal belongs; and
receiving, from each neighboring base station, a system information block message carrying the beam configuration information of the cell to which each of the at least one beam signal belongs.

8. A method for beam-based mobility management by a base station, the method comprising:
receiving a candidate transmission object, wherein the candidate transmission object is determined by a user terminal according to at least one beam signal;
determining a target handover object according to first parameter information of the candidate transmission object, wherein the first parameter information of the candidate transmission object comprises beam configuration information of the at least one beam signal, the beam configuration information of the at least one beam signal comprising a beam width of a cell to which the at least one beam signal belongs and a number of beams operating simultaneously in the cell; and
transmitting second parameter information of the target handover object to the user terminal;
wherein determining the target handover object according to the first parameter information of the candidate transmission object comprises:
selecting, from one or more first candidate transmission beams, a beam signal whose signal parameter value is the maximum signal parameter value as a target handover beam according to parameter information of each of the one or more first candidate transmission beams, and selecting a cell to which the target handover beam belongs as a target handover cell,
wherein the candidate transmission object comprises at least one of the one or more first candidate transmission beams and one or more candidate transmission cells, and the target handover object comprises at least one of the target handover cell and the target handover beam;
wherein the first parameter information of each first candidate transmission beam comprises cell identification information of a cell to which the respective first candidate transmission beam belongs, identification information of the respective first candidate transmission beam, and a signal strength of the respective first candidate transmission beam,
wherein first parameter information of each candidate transmission cell comprises cell identification information and a signal strength of the respective candidate transmission cell; and
wherein the signal parameter value comprises one of a signal strength of the beam signal and a signal feature value of the beam signal, and the signal feature value of the beam signal is proportional to the signal strength of the beam signal, and a beam width of a cell to which the beam signal belongs and the number of beams operating simultaneously in the cell.

9. The method of claim 8, wherein determining the target handover object according to the first parameter information of the candidate transmission object comprises:
acquiring cell parameter values of respective cells to which the one or more first candidate transmission beams belong according to average values or weighted average values of signal parameter values of all beam signals in the respective cells to which the one or more first candidate transmission beams belong; and
determining a cell whose cell parameter value is the maximum cell parameter value from the cells to which the one or more first candidate transmission beams belong as the target handover cell, and further determining a beam signal whose signal parameter value is the maximum signal parameter value in the target handover cell as the target handover beam; and
wherein the signal parameter value comprises one of the signal strength of the beam signal and the signal feature value of the beam signal, and the signal feature value of the beam signal is proportional to the signal strength of the beam signal, and the beam width of the cell to which the beam signal belongs and the number of beams operating simultaneously in the cell.

10. The method of claim 8, wherein determining the target handover object according to the first parameter information of the candidate transmission object comprises:
selecting, from the one or more candidate transmission cells, a cell whose cell parameter value is the maximum cell parameter value as the target handover cell according to the parameter information of each of the one or more candidate transmission cells; and
wherein the cell parameter value comprises one of a signal strength of the cell and a signal feature value of the cell, and the signal feature value of the cell is proportional to the signal strength of the cell, the beam width of the cell, and the number of beams operating simultaneously in the cell.

11. A user terminal, comprising:
at least one processor; and
a computer readable storage, coupled to the at least one processor and storing at least one computer executable instruction thereon which, when executed by the at least one processor, causes the at least one processor to:
acquire at least one beam signal and a signal strength of the at least one beam signal;
determine a candidate transmission object according to the signal strength of the at least one beam signal;
transmit parameter information of the candidate transmission object to a serving base station, wherein the parameter information of the candidate transmission object comprises beam configuration information of the at least one beam signal, the beam configuration information of the at least one beam signal comprising a beam width of a cell to which the at least one beam signal belongs and a number of beams operating simultaneously in the cell; and
receive parameter information of a target handover object determined by the serving base station according to the parameter information of the candidate transmission object;
wherein the candidate transmission object comprises at least one of one or more first candidate transmission beams and one or more candidate transmission cells, and the target handover object comprises at least one of a target handover cell and a target handover beam;
wherein the at least one beam signal comprises at least one neighboring beam signal and a current serving beam signal;
wherein the at least one neighboring beam signal comprises at least one of beam signals in at least one neighboring cell and beam signals other than the current serving beam signal in a serving cell;

wherein the serving cell is a cell to which the current serving beam signal belongs, and the at least one neighboring cell is a cell neighboring the serving cell;

wherein determine the one or more candidate transmission cells according to the signal strength of the at least one beam signal comprises:

determine, from the at least one beam signal, one or more second candidate transmission beams, and calculating signal strengths of respective cells to which the one or more second candidate transmission beams belong;

select, from the respective cells, at least one neighboring cell whose signal strength satisfies a second criterion; and determine the at least one neighboring cell as the one or more candidate transmission cells;

wherein the second criterion comprises one of:

a difference between a signal strength of the serving cell and a signal strength of the neighboring cell is greater than a second offset value;

the signal strength of the neighboring cell is greater than a fourth threshold value; and the signal strength of the neighboring cell is greater than a fifth threshold and the signal strength of the serving cell is less than a sixth threshold value; and wherein determine, from the at least one beam signal, the one or more second candidate transmission beams, and calculating the signal strengths of respective cells to which the one or more second candidate transmission beams belong comprises:

select, from the at least one neighboring beam signal, one or more neighboring beam signals whose signal strengths satisfy a third criterion, and determining the one or more neighboring beam signals selected as the one or more second candidate transmission beams;

acquire at least one target cell to which the one or more second candidate transmission beams belong;

determine whether a number of the one or more second candidate transmission beams in each of the at least one target cell is greater than M;

determine one of the at least one target cell as a first target cell upon determining that the number of the one or more second candidate transmission beams in the one of the at least one target cell is less than or equal to M, wherein a signal strength of the first target cell is an average value or weighted average value of signal strengths of the one or more second candidate transmission beams in the first target cell; and determine another one of the at least one target cell as a second target cell upon determining that the number of the one or more second candidate transmission beams in the another one of the at least one target cell is greater than M, wherein a signal strength of the second target cell is an average value or weighted average value of signal strengths of top M second candidate transmission beams in descending order of signal strength in the second target cell.

12. The user terminal of claim 11, wherein the at least one computer executable instruction, when executed by the at least one processor, further causes the at least one processor to:

select one or more neighboring beam signals from the at least one neighboring beam signal as the one or more first candidate transmission beams, wherein each of the one or more neighboring beam signals has a signal strength satisfying a first criterion and the one or more neighboring beam signals are top N neighboring beam signals in descending order of signal strength in respective cells to which the one or more neighboring beam signals belong.

13. The user terminal of claim 12, wherein the first criterion comprises one of:

a difference between a signal strength of the current serving beam signal and a signal strength of the neighboring beam signal is greater than a first offset value;

the signal strength of the neighboring beam signal is greater than a first threshold value; and the signal strength of the neighboring beam signal is greater than a second threshold value and the signal strength of the current serving beam signal is less than a third threshold value.

\* \* \* \* \*